UNITED STATES PATENT OFFICE.

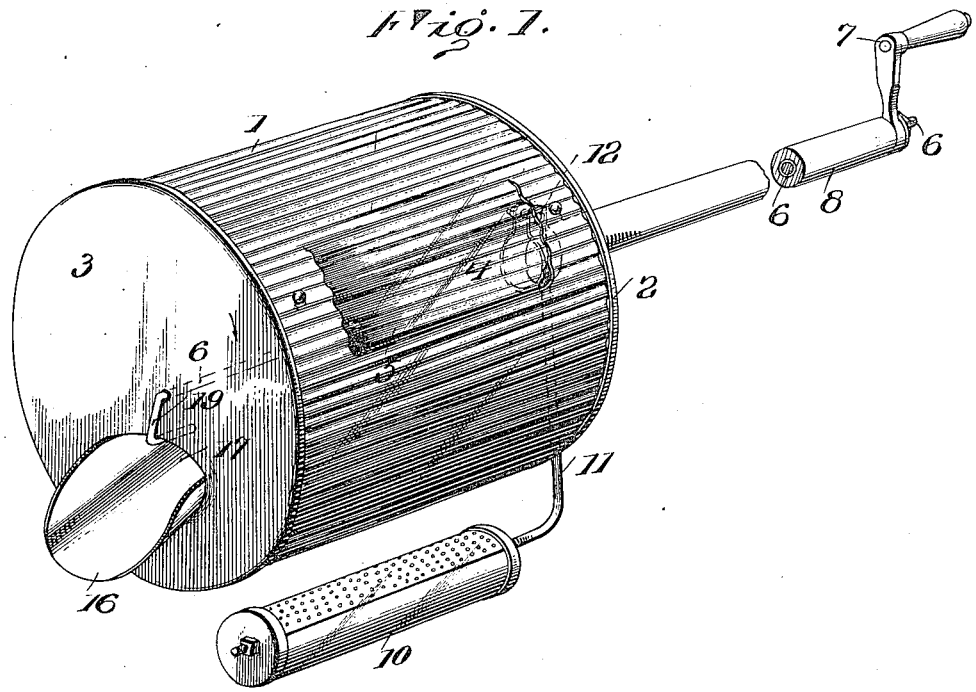
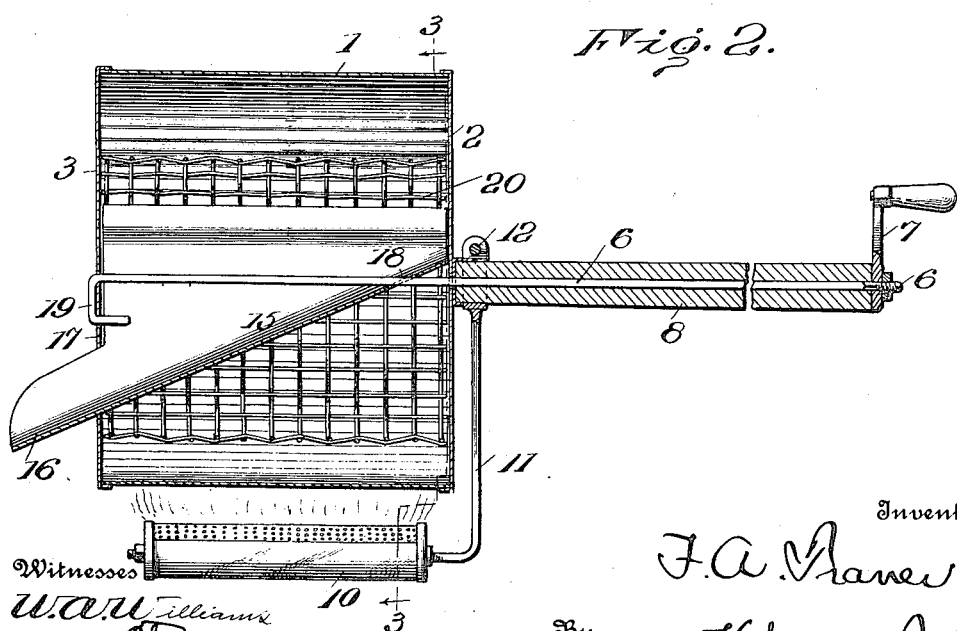

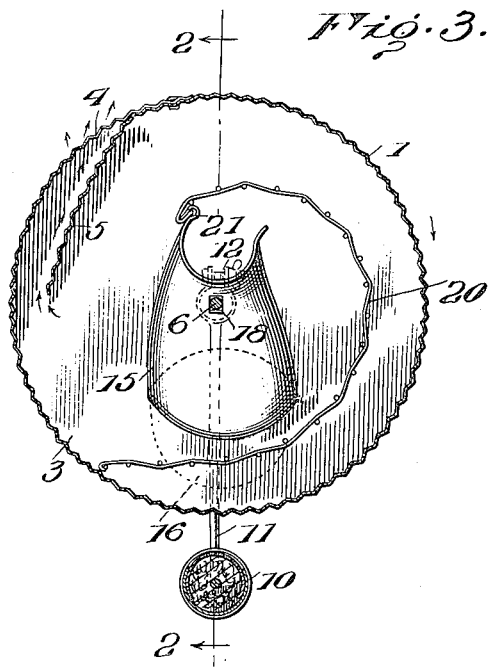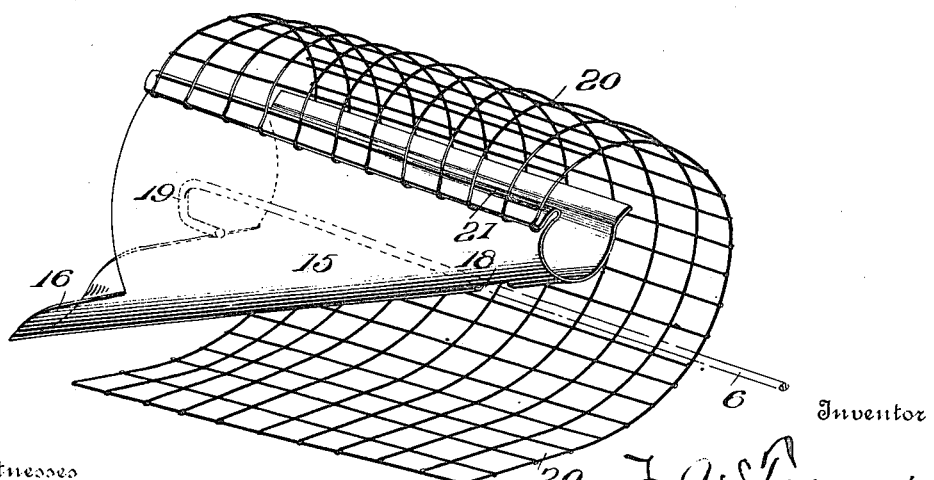

FRANK A. TRAVER, OF MILWAUKEE, WISCONSIN.

CORN-POPPER.

1,153,465.                   Specification of Letters Patent.      Patented Sept. 14, 1915.

Application filed June 15, 1914. Serial No. 845,256.

*To all whom it may concern:*

Be it known that I, FRANK A. TRAVER, a citizen of the United States, residing at Milwaukee, in the county of Milwaukee and State of Wisconsin, have invented certain new and useful Improvements in Corn-Poppers, of which the following is a specification.

This invention relates to certain improvements in corn poppers and the like; and the objects and nature of the invention will be readily understood by those skilled in the art in the light of the following explanation of the accompanying drawings illustrating what I now believe to be the preferred embodiment or mechanical expression of my invention from among other formations, arrangements and constructions within the spirit and scope thereof.

An object of the invention is to provide an improved rotary corn popper that can be held, rotated and manipulated by hand and that will automatically discharge the popped corn during the rotation of the popper.

A further object of the invention is to provide a portable rotary corn popper that can be supported and rotated by the hands and that can be provided with and carry and support a heat generating element or unit in proper position to apply the heat to the popper necessary to carry on the corn popping operation.

A further object of the invention is to provide a hand supported and operated rotary corn popper from which the popped corn will be automatically discharged during the rotation of the popper, from which the unpopped corn can be automatically discharged, and into which the corn can be initially introduced for popping, all without the provision of openings having swingable or other closures that must be opened and closed in carrying out the above mentioned functions and operations.

A further object of the invention is to provide rotary corn poppers, whether of small or large size, with means for separating the popped corn from the unpopped corn and with means for automatically discharging the unpopped corn therefrom by the rotation of the popper.

A further object of the invention is to provide various improvements in the construction and arrangements of parts whereby an improved and highly efficient corn popper will be produced.

The invention consists in certain novel features in construction and in combinations and arrangements as more fully and particularly set forth and specified hereinafter.

Referring to the accompanying drawings, Figure 1, is a perspective of a corn popper involving my invention, a heat generating burner being shown supported thereby. Fig. 2, is a longitudinal vertical section on line 2—2, Fig. 3. Fig. 3, is a cross section on the line 3—3, Fig. 2. Fig. 4, is a detail perspective of the sheet metal chute and the separating screen.

The popper comprises a rotary drum consisting of an approximately cylindrical wall 1, closed by end heads 2, 3, preferably annularly flanged to fit over and around the ends of the cylindrical wall. The cylindrical wall is closed or imperforate except for an unpopped corn discharge hereinafter more fully described, and is preferably formed by a single piece of corrugated sheet metal bent into cylindrical shape and having its overlapping ends riveted together.

The drum is formed with an opening or slit 4, through its peripheral wall and with a deflector, guard, or shield 5, arranged within the drum behind and spaced from said opening to prevent corn within the drum from dropping out through said opening when the drum is rotated in the direction in which it is turned during the popping operation, but to permit automatic discharge of corn through said opening when the drum is rotated in the opposite direction, that is, in an abnormal direction. The deflector extends inwardly from the drum wall at one edge of said opening and then around a short distance within the drum so that its free edge is located a considerable distance beyond that edge of the opening where the deflector joins the circumference of the drum. The deflector is spaced a sufficient distance from the inner surface of the drum cylinder to permit passage of corn under the deflector to said opening.

In the particular example illustrated, this opening and its guarding deflector are formed by providing a sheet far longer than required to produce the cylinder of the desired diameter, and cutting a rectangular notch centrally in the sheet end that is to form the outer lap, and then riveting the two end tongues thus formed to the opposite end portion of the sheet a considerable distance from its end extremity so as to form the elongated opening longitudinally of the cylinder and so as to leave an elongated free sheet end within the drum to form the deflector, said free end being offset inwardly from the line where riveted to said tongues. The width of the deflector is preferably equal to the width of the sheet forming the cylinder and hence the deflector extends the full length of the drum from head to head. The drum is carried and rotated by a rod or shaft 6, extending centrally and longitudinally therethrough and through the end heads thereof and fixed thereto so that the drum rotates therewith. This shaft is elongated a considerable distance beyond the front head 2, of the drum and at its free end is provided with a hand crank 7, for rotating the shaft and drum. A supporting sleeve or handle 8, is arranged on the shaft between the drum head 2, and the hand crank 7. This handle 8, is usually composed of an elongated wooden sleeve through which the shaft removably extends and in which it is rotatable. The projecting rear end of the shaft is usually screw threaded and the hand crank is confined thereon by a nut, or is otherwise removably secured thereto to maintain the handle or sleeve on the shaft and to permit convenient assembling of the parts and to render them knockdown.

From an inspection of the drawings, it will be readily understood how the drum can be held in the desired position over a suitable heat generator, by one hand of the operator grasping the handle 8, while the other hand of the operator is utilized in rotating the drum by the hand crank 7.

The provision of a supporting handle, such as 8, enables me to provide the apparatus, with its own heat generating unit, if so desired. For instance, I show a burner, lamp, stove or torch 10, arranged centrally and longitudinally of and a distance below the drum and rigid with and carried by a suitable upwardly extending bracket 11, at its upper end provided with a suitable clamp 12, detachably applied to the handle 8, and thereby supporting the bracket and burner. The clamp can be in the form of a split collar having a tightening or clamping screw whereby the collar can be tightened on the handle to secure the bracket and burner in the desired adjustment, and whereby the clamp can be loosened and adjusted to the desired position on the handle or removed therefrom. The bracket and burner can be applied to and removed from the popper as desired.

The particular burner shown is in the form of an elongated tube or cylinder in length slightly less than the length of the drum, and composed of a suitable longitudinal imperforate sheet or other metal trough containing asbestos or the like, and a parallel longitudinal perforated metal or wire gauze top or cover inclosing the asbestos and the otherwise open top of the trough. The trough and reticulated cover are usually approximately semi-cylindrical in cross section and fitted together at their longitudinal edges to approximately form a cylinder. Suitable end heads are applied to the cover and trough to secure them together and close the ends thereof. The bracket preferably consists of a rod or wire extending longitudinally through the trough and the end heads and secured thereto and projecting longitudinally from one end of the burner and bent to extend upwardly to the handle 8. This burner is adapted to burn alcohol or the like, as will be readily understood by those skilled in the art, and is of peculiar advantage where a range or stove is not convenient, and yet can be readily removed for packing, or storing or where a range, stove or other fire is convenient.

I provide the drum with an improved device for separating the popped corn from the unpopped corn and discharging the popped corn from the drum during the rotation thereof so as to automatically discharge the popped corn as rapidly as possible to avoid burning or scorching thereof in the drum. In the example illustrated, this separating and discharging device consists of an open-top sheet metal chute or trough 15, approximately U-shape in cross section and arranged longitudinally and approximately centrally of and throughout the interior length of the drum and having its squarely cut off ends or vertical end edges abutting against the drum heads so that the trough is clamped therebetween and its ends are closed thereby, except for the discharge from the trough. The trough is of constantly increasing depth from its front end to its rear end while its top edges are approximately straight or horizontal longitudinally.

The lower rear end portion of the trough is formed with a rearwardly projecting discharge spout 16, concaved in cross section, and this spout is inclined downwardly in longitudinal rearward continuation of the longitudinal downward and rearward continuation of the floor of the trough.

The rear head of the drum is formed with a transverse opening 17, located between its center and periphery, and this opening usually corresponds in shape to the cross sectional formation of the spout 16, which extends therethrough and projects rearwardly beyond said rear head of the drum.

The opening 17, is preferably of such dimensions that the spout must be slightly contracted, that is, its side walls must be slightly sprung toward each other, to pass therethrough and hence the spout is held in the opening under tension thereby aiding in securing the trough in position in the drum and against rattling, although the trough and its spout are removable from said end head, when the popper is knocked down.

The trough is further supported and held in proper position in the drum by the shaft 6, which passes removably through a perforation 18, in the upper rear end portion of the trough, and in this connection it will be noted that the floor of the trough extends obliquely throughout the length of the drum and intersects the longitudinal axis of the drum. The shaft 6, passes removably through central perforations in the drum heads 2, 3, and the exposed rear end of the shaft is formed with the hooked or doubled back end 19, arranged at the exterior of the head 3, and having the forward projection removably entering opening 17, to lock the drum to rotation with the shaft and to clamp the rear head to the drum cylinder.

A separating screen 20, extends throughout the length of the drum between the end heads thereof and is approximately spirally arranged partially around the longitudinal axis of the drum and extending from one longitudinal upper edge of the trough to the circumference of the drum at a point remote from the free end of the guard or deflector 5, over discharge opening 4. The inner or rear end of this screen is secured to the rear longitudinal edge or wall of the trough and the screen extends forwardly therefrom past and spaced from the open top and remainder of the trough, while the forwardly extending opposite or free end of the screen removably engages or rests on the inner surface of the circumferential wall of the drum, all with reference to the direction of normal rotation of the drum. The screen is preferably fixed to and carried by and removable from and applicable to the drum with the trough. In the particular example shown, the rear longitudinal wall of the trough is extended upwardly and forwardly on curved lines to guide the popped corn into the trough and its edge 21, is doubled back or hooked to form a seam gripping and clamping the hooked rear edge of the screen. The usually somewhat lower front longitudinal wall of the trough is also usually transversely curved upwardly and forwardly to catch the popped corn dropping from the screen and guide the same into the trough. The screen can be composed of any suitable material to provide openings for the free passage of the unpopped corn but of such size as to prevent the passage of the popped corn therethrough. The corn to be popped can be introduced into the drum through the opening 4, or through the opening 17, and the trough.

During operation, the rotation of the drum in normal direction will cause the unpopped corn to roll on the inner surface of the circumferential wall of the drum and through the screen openings. As the corn pops, the popped kernels are deflected from the circumferential wall by the screen and roll or slide along said screen and are guided thereby into the open top of the trough as the trough reaches its upright position during each complete revolution. The popped corn deposited in the trough quickly and freely travels down the same and drops from the rear spout thereof.

I attain advantages in operation by employing the smooth surface trough as the popped corn freely travels along the surface thereof and is quickly discharged to avoid clogging. I also attain structural advantages by the employment of the trough. I also attain advantages by providing the circumferential wall of the drum with a longitudinally irregular surface, or otherwise providing the inner circumferential portion of the drum with corn lifting portions to keep the corn rolling and turning over to avoid burning thereof as happens where the drum circumference has a smooth inner surface on which the kernels can slide without rolling.

In the particular example shown, I form the drum circumferential wall with comparatively small closely arranged somewhat angular longitudinal corrugations to cause the desired rolling action of the kernels.

It is evident that various changes, variations, and modifications might be resorted to without departing from the spirit and scope of my invention and hence I do not wish to limit myself to the exact disclosure hereof.

What I claim is:—

1. A rotary hand supported and operated corn popper having a handle, and a burner carried by and removably attached to the handle.

2. A corn popper comprising a handle, a rotary drum having its hand operated rotating shaft mounted in and carried by said handle, and a burner arranged below and in operative relation with respect to the drum and provided with a supporting bracket removably applied to and carried by said handle.

3. A corn popper comprising a handle, a movable popping drum carried by the handle, and a removable burner normally operatively arranged below and with respect to said drum and provided with a supporting bracket having a clamp for securing the same to said handle, said bracket and its clamp and burner being removable from said handle.

4. A corn popper comprising a rotary drum having supporting means and a rotating shaft, said drum having its circumferential wall composed of sheet material having overlapping ends forming a circumferential opening and a guard within the drum for said opening to prevent passage of corn through the opening when the drum is rotated in normal direction and to cause discharge of unpopped corn through said opening when the drum is rotated in abnormal direction.

5. A corn popper comprising a rotary drum and means for rotating the same in either direction, said drum having a longitudinal discharge opening through its circumferential wall, and a guarding deflector within the drum for said opening, said deflector preventing access to the opening from within the drum except under the free edge of the deflector when the drum is rotated in an abnormal direction, said deflector formed by an inwardly-deflected projecting end of said wall.

6. A corn popper comprising a drum having means for rotating the same in either direction, said drum provided with means for auomatically separating the popped corn from the unpopped corn and discharging the popped corn at the exterior of the drum as the drum is rotated, said drum having a discharge passage through its circumferential wall for unpopped corn and an internal deflector over said passage to prevent discharge of corn therethrough during the rotation of the drum in normal direction, said wall comprising sheet material having ends secured together, one end notched to form said passage and the other end projecting within the drum to form said deflector.

7. A corn popper comprising a rotary drum consisting of a circumferential wall having end heads, one of said heads being removable, a longitudinally-inclined discharge trough arranged throughout the length of said drum and at its ends abutting the inner faces of said heads, one head having an opening through which said trough discharges, a separating screen arranged spirally around said trough and at one end fixed to one edge of said trough and at the opposite end engaging the inner surface of said wall of the drum and at its edges engaging the inner surfaces of said heads, said trough and said screen being longitudinally removable together from said drum on the removal of said removable head.

8. A corn popper comprising a rotary drum having a circumferential wall and end heads, a drum-supporting-and-rotating shaft extending longitudinally through said drum and its heads, an open-top trough rotating with and extending throughout the length of said drum and having end edges abutting the inner faces of said heads, said trough having a longitudinally inclined floor, the rear end of said trough having a discharge spout in continuation of the lower end of said floor, the rear end head having an opening through which said spout projects, and screen means within said drum to separate the popped corn from the unpopped corn and to discharge the same onto the inclined floor of said trough.

9. A corn popper comprising a rotary rotary drum having a U-shaped sheet metal trough arranged longitudinally thereof throughout the length of the interior of the drum and projecting rearwardly to the exterior of one end of the drum and longitudinally inclined to its rear discharge end, and a separator screen spirally arranged within the drum at the exterior of said trough and at one end secured to one longitudinal edge of the trough and at its other end engaging the inner surface of the circumferential wall of the drum, said drum having an unpopped corn discharge opening through its circumferential wall located at a point remote from said other end of said screen, said wall having an inwardly-deflected portion within the drum extending over and beyond said opening to deflect the corn therefrom during normal rotation of the drum.

10. A corn popper comprising a rotary drum having end heads and a circumferential wall closed against passage of corn therethrough during the rotation of the drum in normal direction, one end head having a restricted opening therethrough located between the center of the head and the peripheral portion thereof, and a separating device within the drum for automatically discharging the popped corn from the drum during the rotation of the drum in normal direction, said separating device comprising an open-top sheet metal trough longitudinally inclined and arranged between the end heads of the drum and throughout the length of the drum and having a reduced end spout projecting through said opening, and a separating screen arranged within the drum and leading to said trough for discharging the popped corn thereinto, said trough carrying said screen and rotating with said drum.

11. A corn popper comprising a rotary drum, and a separating device therein for automatically discharging the popped corn from the drum during the rotation of the drum in normal direction, said device consisting of a sheet metal trough longitudinally open at the top and clamped between the end heads and arranged within the drum and extending throughout the length thereof and longitudinally inclined and provided with a discharge end opening through an end head of the drum, and an approximately spirally arranged separating screen within the drum extending over the open top of the trough and at one end secured to one edge wall of said trough and at the other end arranged adjacent the inner surface of the circumferential wall of the drum.

12. A corn popper comprising a rotary drum having end heads and a circumferential wall, one of said heads having a contracted off center discharge opening, and means for automatically separating the popped corn from the unpopped corn and discharging the same from the drum comprising a sheet metal trough or chute arranged longitudinally of and within the drum throughout the length thereof and having a discharge spout projecting through said opening and snugly fitting the same, said trough and its spout being longitudinally inclined, said trough rotating with said drum and at its ends engaging and clamped between said end heads, substantially as described.

13. A corn popper comprising a rotary drum having a circumferential wall and end heads, one head having an off center discharge opening, automatic popped corn discharging means within the drum comprising a discharge chute alined with said opening, a handle, a shaft for carrying and rotating the drum, said shaft being removably fitted in said handle and rotating therein and extending centrally and removably through said heads and the drum, and having a hooked end at the exterior of said head having the discharge opening and projecting forwardly into said opening.

14. A corn popper comprising a rotary drum having a shaft for rotating and supporting the same, a tubular handle through which said shaft extends and in which it is rotatable, the shaft projecting beyond said handle and provided with a hand crank whereby the shaft and drum can be rotated, and a burner arranged exteriorly of and normally below said drum and carried by and fixed to a supporting bracket, said bracket being arranged approximately radially of and secured to said handle, whereby the handle can be partially rotated on said shaft to move said burner to an abnormal position beside or above said drum.

15. A corn popper comprising a rotary drum having a circumferential wall and end heads, a drum-supporting shaft coupled thereto for rotating the same and extending therefrom and provided with rotating means, a handle mounted on said shaft in which the shaft rotates, a discharge trough arranged throughout the length of said drum and clamped between the heads thereof and having a longitudinally inclined floor, one end head having a discharge opening, the lower end of said trough having a reduced discharge spout in continuation of said floor and projecting through said opening, and a screen within the drum for discharging the popped corn into said trough.

16. A corn popper comprising a rotary drum having a circumferential wall and end heads, an open-top trough extending throughout the length of said drum and having transverse end edges abutting the inner surfaces of said heads, said trough having a longitudinally inclined floor at its lower end terminating in a contracted discharge spout in continuation of said floor, one head having an opening through which said spout projects, the ends of said trough being otherwise closed by said heads, a screen within the drum for picking up the popped corn and discharging the same onto said floor through the open top of said trough, and a drum rotating and supporting shaft.

17. A corn popper comprising a rotary drum having circumferential walls and end heads, an open-top trough extending throughout the length of said drum, said trough having a longitudinally inclined floor terminating in a discharge spout in continuation thereof, one head having an opening through which said spout projects, a drum-supporting-and-rotating shaft extending through said drum and passing through the floor of said trough between the upper and lower ends thereof, and a screen within said drum for picking up the popped corn and discharging the same onto said floor through the open top thereof.

In testimony whereof I affix my signature in presence of two witnesses.

FRANK A. TRAVER.

Witnesses:
O. A. KREMERS,
GEORGE R. WIENS.